Aug. 5, 1924.　　　　P. J. MADIGAN　　　1,503,906
TILTING BOX TRUCK
Filed Aug. 22, 1921　　3 Sheets-Sheet 2
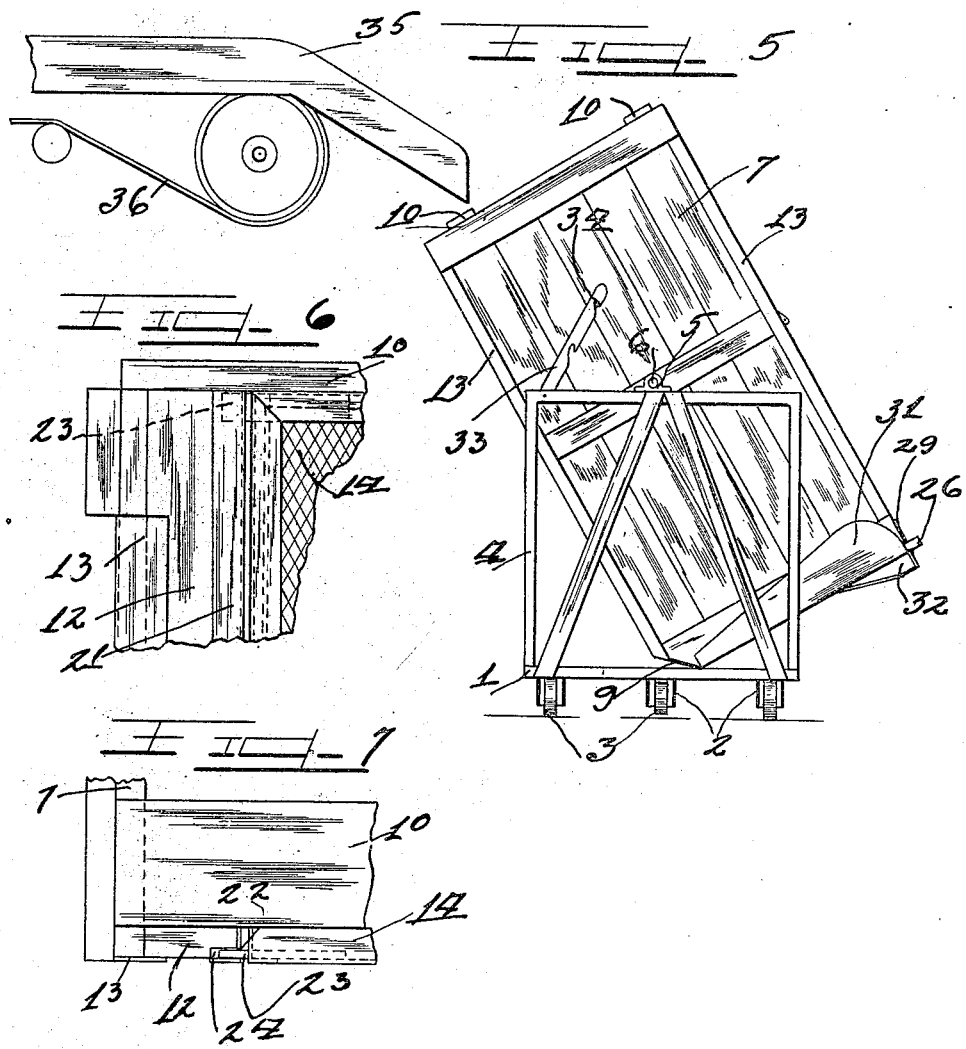

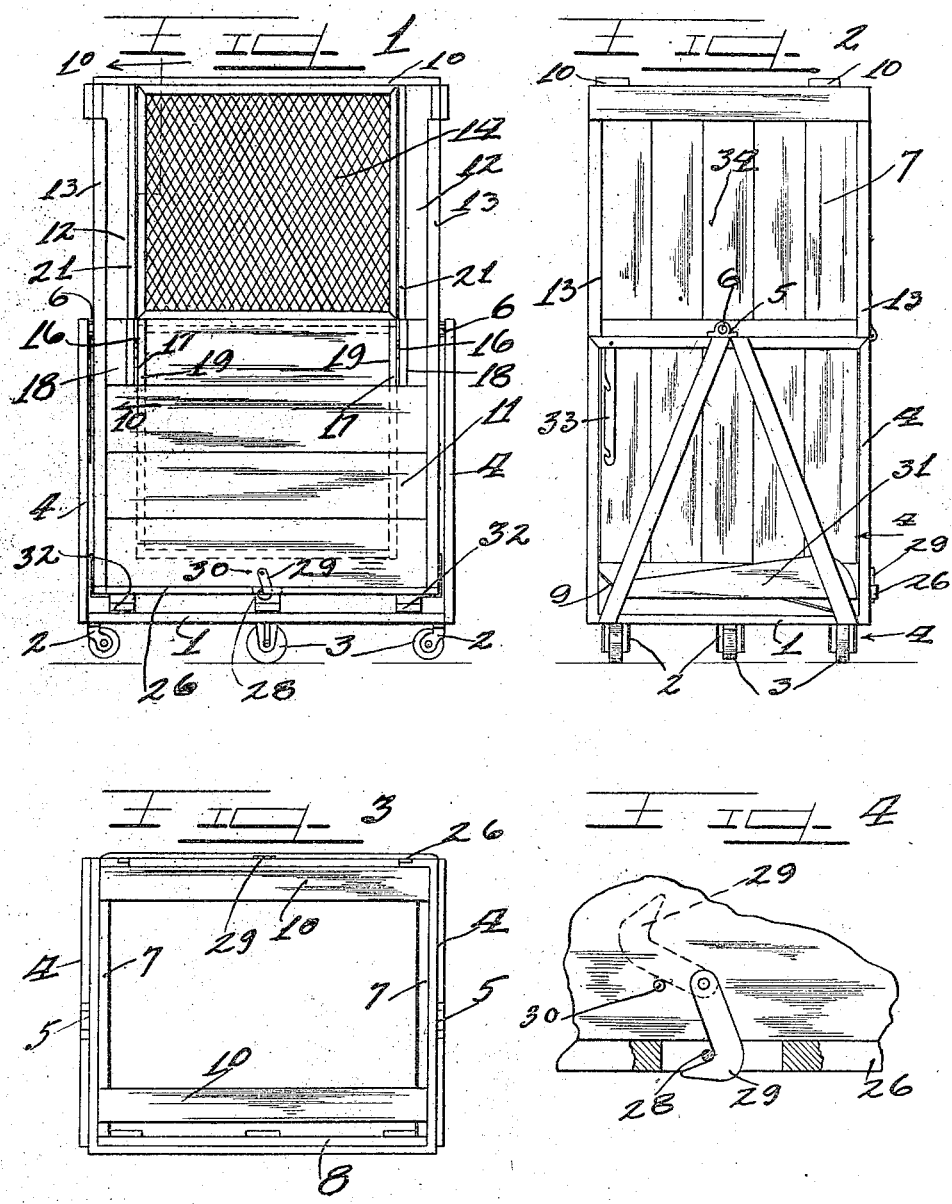

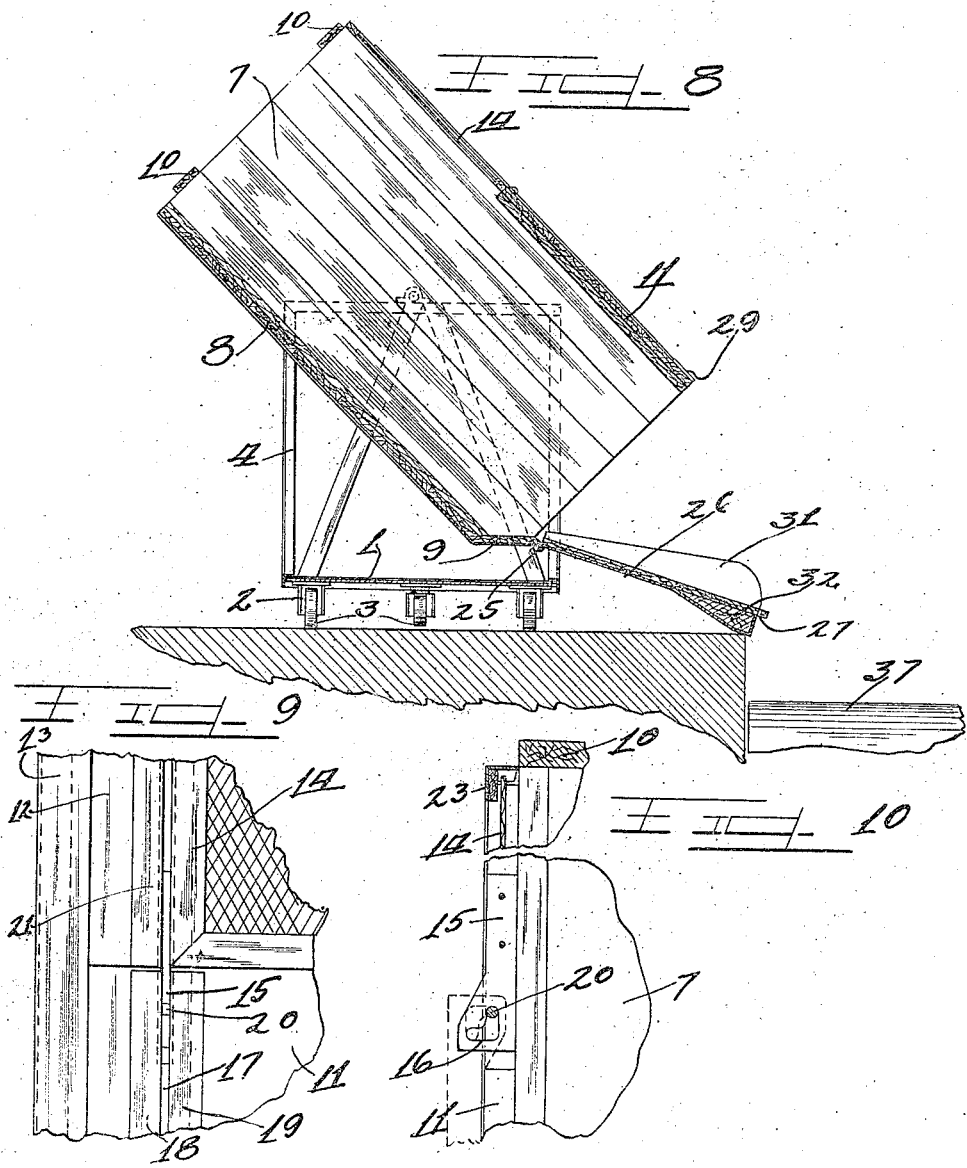

Patented Aug. 5, 1924.

1,503,906

UNITED STATES PATENT OFFICE.

PATRICK J. MADIGAN, OF CHICAGO, ILLINOIS.

TILTING-BOX TRUCK.

Application filed August 22, 1921. Serial No. 494,242.

*To all whom it may concern:*

Be it known that I, PATRICK J. MADIGAN, a citizen of the United States, and a resident of the city of Chicago, in the county of Cook and State of Illinois, have invented certain new and useful Improvements in a Tilting-Box Truck; and I do hereby declare that the following is a full, clear, and exact description of the same, reference being had to the accompanying drawings, and to the numerals of reference marked thereon, which form a part of this specification.

This invention relates to an improved type of a truck provided with a pivotally mounted box constructed with suitable doors to permit rapid unloading from the side or from the bottom by tilting the box, which operation automatically opens the bottom door.

It is an object of this invention to provide an improved type of truck adapted for use in parcel post mailing rooms or for carrying other materials such as sand or coal into position to permit rapid unloading of the same.

It is also an object of the invention to provide a truck wherein a latch mechanism is provided for holding a rotatable box in an inclined loading position on a truck frame.

Another object of the invention is to provide a truck wherein a rotatable box is so mounted on a truck frame that the box automatically assumes a vertical position and holds a bottom door in closed position.

It is a further object of the invention to provide a parcel post package carrying truck wherein a box having an automatically opening and closing discharge door at the bottom thereof, is pivotally mounted on a truck frame to permit the box to be latched or manually held in a tilted position allowing the contents of the box to be rapidly discharged.

It is an important object of this invention to construct a truck wherein a truck frame has a normally vertical box journalled thereon to permit the box to be swung into an inclined loading position or into an inclined unloading position in which a bottom door is adapted to be unlatched to permit a rapid discharge of the contents of said box.

Another important object of this invention is to provide a truck with a pivoted box having a bottom door attached thereto and adapted to automatically fall into an open position as the box is tilted into an unloading position, said door also adapted to be automatically closed with the return of said box to its normal vertical position.

It is furthermore an important object of the invention to provide a truck having a box adapted normally to automatically assume a vertical position, said box having one or more doors in the walls thereof adapted to be opened to permit loading or unloading of the box while in normal vertical position.

Other and further important objects of this invention will be apparent from the disclosures in the drawings and specification.

The invention (in a preferred form) is illustrated in the drawings and hereinafter more fully described.

On the drawings:

Figure 1 is a rear elevation of a truck embodying the principles of this invention.

Figure 2 is an end elevation thereof.

Figure 3 is a top plan view of the truck.

Figure 4 is an enlarged fragmentary detail section taken on line 4—4, of Figure 2.

Figure 5 is an end elevation of the truck showing the box latched in a tilted loading position to receive articles from a loading conveyor and chute.

Figure 6 is an enlarged fragmentary detail view of the upper rear corner of the truck box.

Figure 7 is a top plan view thereof.

Figure 8 is a vertical section taken through the truck showing the box tilted into unloading position with the bottom door open.

Figure 9 is a fragmentary detail view showing the hinge connection for the screen door.

Figure 10 is a fragmentary detail section partly broken away and taken on line 10—10, of Figure 1.

As shown on the drawings:

The truck frame comprises a bottom 1, having castor brackets 2, secured on the under surface thereof, for rotatably supporting castor rollers or wheels 3. Rigidly mounted transversely upon each end of the truck frame bottom 1, is an upright end rail or supporting frame 4, on the top of which is secured a bearing bracket 5, for rotatably receiving the outer end of a stub shaft or trunnion 6. The trunnions 6, are secured slightly above and off center of the side walls 7, of a package receiving box to permit the box to normally assume a vertical position. The box may be tilted normally into a loading or into an unloading position as shown in Figures 5 and 8, respectively. Secured to the side walls 7, is a front wall 8, the lower end of which joins an inclined corner board 9. Connecting the tops of the box side walls 7, are two cleats or braces 10, positioned near the front and rear of the box. The rear wall of the box embraces a lower wall section 11, to which is secured two uprights 12, which extend to the top of the box. Angle irons 13, are secured at the corners of the box where the side walls join the front and rear walls.

A screen door 14, forms the upper half of the rear wall of the box, and said screen door has secured to the side sills thereof hinge plates 15, each having an angle slot 16, formed in the enlarged lower end thereof, which projects beyond the lower end of the screen door. The slotted ends of the hinge plates 15, project into spaces 17, provided by angle irons 18 and 19, attached to the lower rear will section 11, as disclosed in Figure 9. Hinge pins 20, are supported by the angle irons 18 and 19, and project through the angle slots 16, of the hinge plates 15. Angle irons 21, are secured to the corners of the uprights 12. The upper ends of the angle irons 21, are provided with notches 22, adapted to removably receive the projecting ends of catches or locking bars 23, secured to the screen door frame. The upper ends of the rear wall uprights 12, are each provided with a recess or opening 24, for receiving the projecting ends of the catches 23, as shown in Figure 7.

Secured to the inclined corner board 9, is one part of a hinge 25, the other portion of which is secured to a bottom door 26, of the box. The door 26, projects beyond the rear lower wall section 11, and is provided with a slot 27, through which a locking pin 28, projects. Pivotally mounted at the lower central portion of the lower rear wall section 11, is a hooked catch 29, which normally projects into the slot 27, to engage the pin 28, as shown in Figure 4, for holding the bottom door 26, locked in closed position. A stop pin 30, is provided on the lower rear door section 11, to limit the throw of the hooked catch 29. The bottom door 26, is provided with side flange plates 31, and with tapered cleats or shoes 32, which act to slide on the edge of the truck frame floor to cause automatic closing of said bottom door when the truck box is released and automatically return to normal vertical position.

Pivotally mounted at the top of one of the frame rails 4, is a notched latch bar 33, adapted to be removably engaged on a pin 34, on one of the box side walls 7, for holding the box in a tilted loading or unloading position.

As shown in Figure 5, the reference numeral 35, indicates a loading chute equipped with a loading conveyor 36. When the truck is in an unloading position as shown in Figure 8, packages from the tilted box are adapted to fall upon a discharge conveyor 37, or upon the floor.

The operation is as follows:

Normally the truck box is positioned in an upright position as shown in Figures 1 and 2, with the screen door 14, and the bottom door 26, closed. To fill or load the box, the truck is pushed into a position beneath the delivery chute 35. The box is then tilted into a loading position as shown in Figure 5, so that the open top of the box is positioned adjacent the mouth of the chute 35, to receive parcels or packages therefrom. The box is held in its tilted loading position either manually or by means of the notched latch bar 33, which lockingly engages the box pin 34. While in tilted loading position the bottom may be locked by the hooked catch 29, which is engaged with the pin 28.

When the box is loaded, the latch bar 33, is removed from its engagement with the pin 34, and the box automatically swings back into vertical position. The truck may now be pushed or drawn into an unloading position as shown in Figure 8. The hooked catch 29, may now be released from the pin 28, and the box is then manually pushed to an unloading position. The box is tilted and held in its unloading position either manually or by the latch ber 33, and the pin 34. The inclined corner board 9, permits the lower front corner of the box to clear the truck frame floor 1. Since the catch 29, has been released, tilting of the box permits the bottom door 26, to automatically fall into open discharge position. If desired the hooked catch 29, may be left in its locking position during the tilting of the box and released after the box has been tilted. In the open position of the door 26, the door serves as a guide chute to permit the packages from the box to be discharged onto the floor or onto the conveyor 37, to be carried away.

After the box has been loaded in a tilted position and released, it automatically returns to vertical position, and the contents of the box may be removed if desired by opening the screen door 14. This is done by slightly raising the screen door to permit the catch bars 23 to be lifted out of the openings 24, and then swinging the screen door 14, outwardly and downwardly, by means of the hinge plates 15, which co-act with the pins 20. With the screen door 14, in open position the contents of the box may be manually removed.

It will of course be understood that the truck box may be provided with a plurality of doors in the front, rear or side walls, to conveniently permit rapid loading or unloading of the box without necessitating tilting of the box. Attention is also directed to the fact that the pivoted box may be loaded when in vertical position either through the open top or through any of the side doors when open. When this is done the hooked catch 29, may be thrown into the dotted line position against the stop pin 30, as shown in Figure 4. The bottom door 26, is now held in closed position by means of the door shoes 32, which rest on the truck frame floor 1 when the box is in vertical position. Tilting of the box will now cause the door 26, to slide outwardly and automatically drop into open position as shown in Figure 8, allowing the box to be emptied.

I am aware that numerous details of construction may be varied through a wide range without departing from the principles of this invention, and I therefore do not purpose limiting the patent granted otherwise than necessitated by the prior art.

I claim as my invention:

1. In a distributing system, a vehicle, a box pivotally mounted in said vehicle, the height of the pivot above the bottom of the box being such that more than half of the bottom of the box will be brought beyond the side of the vehicle by a motion about said pivot of less than forty-five degrees from the vertical, the portion of the bottom of the box toward the side protruded by said motion being pivotally connected to the box, the pivot being adjacent the non-protruding side of the bottom, and a stop preventing the motion about the pivot of the box in the direction opposite to the first-named motion beyond the vertical.

2. In a distributing system, a vehicle, a box pivotally mounted in said vehicle for tilting about an axis running from end to end of the vehicle and located a distance above the bottom of the box more than half the length from top to bottom of the box, whereby tilting the top of the box over one side of the vehicle will cause the bottom of the box to protrude beyond the other side of the vehicle, and a dumping bottom in said box.

3. In a distributing system, a vehicle, a box pivotally mounted in said vehicle for tilting about an axis running from front to rear of the vehicle and located a distance above the bottom of the box more than half the length from top to bottom of the box, whereby tilting the top of the box toward one side of the vehicle will cause the bottom of the box to protrude beyond the opposite side of the vehicle, a dumping bottom in said box, and a stop on said bottom preventing tilting said box in the opposite direction beyond the vertical.

4. In a distributing system, a vehicle, a box pivotally mounted in said vehicle for tilting about an axis running from front to rear of the vehicle and located a distance above the bottom of the box more than half the length from top to bottom of the box, whereby tilting the top of the box toward one side of the vehicle will cause the bottom of the box to protrude beyond the other side of the vehicle, a dumping bottom in said box, and automatic closing means for said bottom including a stop thereon preventing tilting said box in the opposite direction beyond the vertical.

5. In a combination, a platform mounted on casters, frames secured to said platform and pivotally supporting a box for swinging about an axis running from front to rear of said platform, a hinged bottom to said box, a hinged door closing the upper part of the side of said box opposite the hinges of said bottom and means on said bottom for bringing it to closed position when the box is vertical, said means acting as a stop to prevent tilting of the box about its axis beyond the vertical in the direction toward said door.

6. In a vehicle, a box tiltable about an axis, a hinged door in one of the sides of the body parallel to the axis, and a hinged bottom to the box, the hinged edge of said bottom being opposite the side having the door.

7. A truck embracing a frame, rollers supporting the same, a box adjustably mounted on said frame and open at the top, bottom and at the upper portion of one of the box walls, a pin on said box, a latch on said frame adapted to engage said pin to hold the box tilted in a loading position to permit articles to be deposited into the open top of the box, a screen door for removably closing the opening in said box wall, means for holding the screen door in locked position, a bottom door for closing the bottom of said box, and a catch mechanism for holding the bottom door in closed position, said box adapted to be tilted into an unloading position and held there by said latch to permit release of said catch mechanism and opening of the bottom door for discharge of the contents of said box.

In testimony whereof I have hereunto subscribed my name in the presence of two subscribing witnesses.

PATRICK J. MADIGAN.

Witnesses:
 CARLTON HILL,
 FRED E. PAESLER.